(12) United States Patent
Duan

(10) Patent No.: US 7,066,854 B2
(45) Date of Patent: Jun. 27, 2006

(54) HYBRID ELECTRIC VEHICLE

(76) Inventor: Zhihui Duan, 3012 Gallinger Dr., Ann Arbor, MI (US) 48103

(*) Notice: Subject to any disclaimer, the term of this patent is extended or adjusted under 35 U.S.C. 154(b) by 173 days.

(21) Appl. No.: 10/822,828

(22) Filed: Apr. 12, 2004

(65) Prior Publication Data
US 2004/0204277 A1    Oct. 14, 2004

Related U.S. Application Data

(60) Provisional application No. 60/462,202, filed on Apr. 12, 2003.

(51) Int. Cl.
*F16H 3/72* (2006.01)
(52) U.S. Cl. .................................... 474/2; 475/5
(58) Field of Classification Search .............. 475/2, 475/5; 180/65.1, 65.3, 65.4
See application file for complete search history.

(56) References Cited

U.S. PATENT DOCUMENTS

| | | | | |
|---|---|---|---|---|
| 1,965,432 A | * | 7/1934 | Robinson | 318/736 |
| 2,748,333 A | * | 5/1956 | Royal | 318/818 |
| 3,274,472 A | * | 9/1966 | Slattery | 318/729 |
| 5,701,066 A | * | 12/1997 | Matsuura et al. | 318/808 |
| 5,842,534 A | * | 12/1998 | Frank | 180/65.2 |
| 6,059,059 A | * | 5/2000 | Schmidt-Brucken | 180/65.3 |
| 6,209,672 B1 | | 4/2001 | Severinsky | |

FOREIGN PATENT DOCUMENTS

JP          8-66099     *  3/1996

OTHER PUBLICATIONS

G. McPherson, An Introduction to Electrical Machines and Transformers, 1981, by John Wiley & Sons, Inc. USA, Chapter 2 and 4.

* cited by examiner

*Primary Examiner*—Ha Ho

(57) ABSTRACT

A hybrid electric vehicle comprises an internal combustion engine, a starter/generator (SG), a motor control module (MCM), a traction motor (TM), a clutch, and a battery. The engine provides power to SG to generate poly-phase alternating current; it also drives the wheels directly when the clutch is engaged. TM drives the vehicle wheels; it also provides braking torque to the wheels and regenerates electric energy from the kinetic energy of the vehicle. TM is a multi-speed poly-phase induction motor and is electrically connected to SG. TM, SG and the clutch together accomplish the function of "changing gear", and no mechanical transmission is needed. MCM provides alternating current to and control SG and TM to work in their desired modes. The battery stores and provides electrical energy as needed.

6 Claims, 3 Drawing Sheets

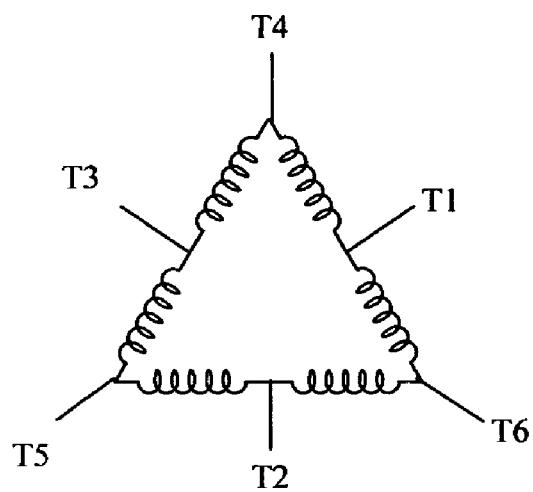
Winding of a
multi-speed motor
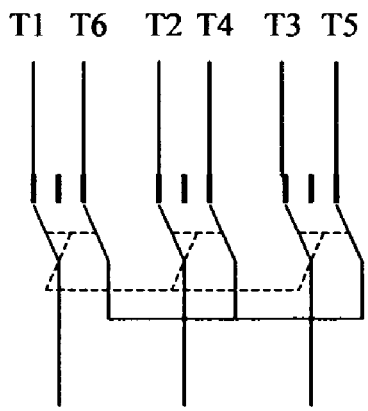
Speed switch:
at low speed position
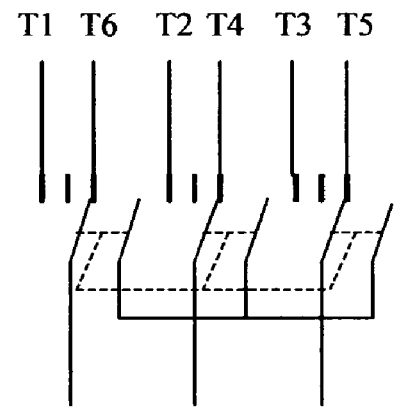
Speed switch:
at high speed position
Figure 2: Multi-speed poly-phase induction motor:
its winding and speed switch

HYBRID ELECTRIC VEHICLE

CROSS-REFERENCE TO RELATED APPLICATION

This application claims the benefit of PPA Ser. No. 60/462,202, filed 2003 Apr. 12 by the present inventor.

FEDERALLY SPONSORED RESEARCH

Not Applicable

SEQUENCE LIST OR PROGRAM

Not Applicable

TECHNICAL FIELD

This invention relates to hybrid-electric drive system for passenger cars and light trucks. More particularly, this invention relates to a hybrid electric drive system using multi-speed motors.

BACK GROUND OF THE INVETION

A conventional vehicle usually has an internal combustion engine as its primary power, and the engine converts the chemical energy in the fuel into mechanical torque. The torque is transmitted through a mechanical transmission to the wheels, driving the vehicle. The transmission can change gear, or change the speed ratio of the engine to the wheels. For most passenger cars and light truck, the speed ratio of the top gear is about 4 times of that of the low gear. For example, if a vehicle has gear ratios of 2.80:1, 1.50:1, 1.00:1, and 0.71:1, the speed ratio of the top gear (0.71:1) is 2.80/0.71=3.94 times of that of the low gear (2.80:1).

Alternatively, the power from the engine can be transmitted by electricity: an alternator converts the engine power into electrical power, the electrical current powers a traction motor(s), and then the motor(s) drives the vehicle.

Since semiconductor inverter becomes affordable, alternating current (AC) machines are widely used for power transmission for vehicles. An alternator is mounted on the engine shaft and generates AC electricity, a rectifier or inverter converts the AC power into direct current (DC) power, then an inverter converts the DC into AC with variable frequency, and the AC current drives an AC traction motor(s). Changing AC frequency can control the motor's effort of driving or braking.

In a hybrid-electric vehicle, a package of battery provides extra electrical power when high torque is needed. It also stores electrical energy when the vehicle is braking or cruising.

A hybrid electric drive system is proposed for passenger cars in U.S. Pat. No. 6,209,672. The system comprises one alternator, one traction motor, two inverters, one traction battery, and one clutch. The alternator is connected to the engine shaft to start the engine and generate electric power; one of the inverters converts DC from the battery into multi-phase AC to drive the alternator to start the engine, and it converts the AC power from the alternator into DC when the alternator generates electricity; the traction motor drives the wheels, as well as brakes the wheels while re-generating electrical energy; the second inverter converts DC into AC for the traction motor; the battery stores and provides the electric energy as needed; the clutch allows the engine to drive the wheels directly during cruise to improve the fuel efficiency.

In this system, all the electric power from the alternator is converted into DC, and the second inverter provides all the electric power needed to the traction motor. As a result, a significant amount of energy is dissipated in the inverters when the electric currents go through them, lowering the fuel efficiency. Also this system requires large capacity of inverters since one inverter is to control the alternator and another is to provide all the electrical power needed to drive the vehicle. Semiconductor inverter is expensive, and the price is proportional to its capacity, so this system is very expensive.

The purpose of this invention is to provide a hybrid electric vehicle that requires smaller capacity of inverter and has lower manufacturing cost. A multi-speed motor is used, and the electric power from the alternator can directly go to the traction motor. A clutch allows the engine to drive the wheels directly, improving the fuel efficiency.

SUMMARY OF THIS INVETION

The objective of the present invention is to provide a hybrid electric drive system for passenger cars and light truck.

According to the present invention, a hybrid vehicle has an internal combustion engine, an alternator, a multi-speed induction motor, a motor control module, a clutch, and a battery.

The engine provides torque to the alternator to generate electric power. The engine drives the wheels directly when the clutch is engaged while the vehicle is cruising.

The alternator is mounted on the engine shaft. It starts the engine by using the AC power from the control module; it generates electric power when the engine is running. The AC power from the alternator either directly goes to the traction motor or passes the inverter in the control module, being converted into DC power.

The traction motor (TM) is a multi-speed poly-phase AC motor, and its speed is determined by the current frequency and the number of pole pairs. Its speed switch can change the number of the pole pairs and change the speed. The TM provides drive force to the wheels. Also TM provides braking torque to the wheels and converts the kinetic energy into electric energy during braking.

The clutch allows the engine to directly drive the wheels when the vehicle cruises, improving fuel efficiency.

By coordinating SG, TM and the clutch, the system provides the speed ratios of 4:1, 2:1, 1:1 and 4:(−1), suitable to family vehicles.

The motor control module (MCM) includes an inverter. MCM converts DC from a battery into AC to drive the electrical machines; it also converts AC from the electric machines into DC for the battery to store. MCM powers SG to start the engine, powers TM to drive the wheels, and controls TM to brake the wheels and regenerate electricity.

The battery stores the electrical energy generated by the electrical machines and provides electric power for them to create torque.

No mechanical transmission is needed.

BRIEF DESCRIPTION OF THE DRAWINGS

FIG. 2 illustrates the winding and the speed switch of a multi-speed poly-phase induction motor.

DETAILED DESCRIPTION OF THE PREFERED EMBODIMENT

Figure 1:
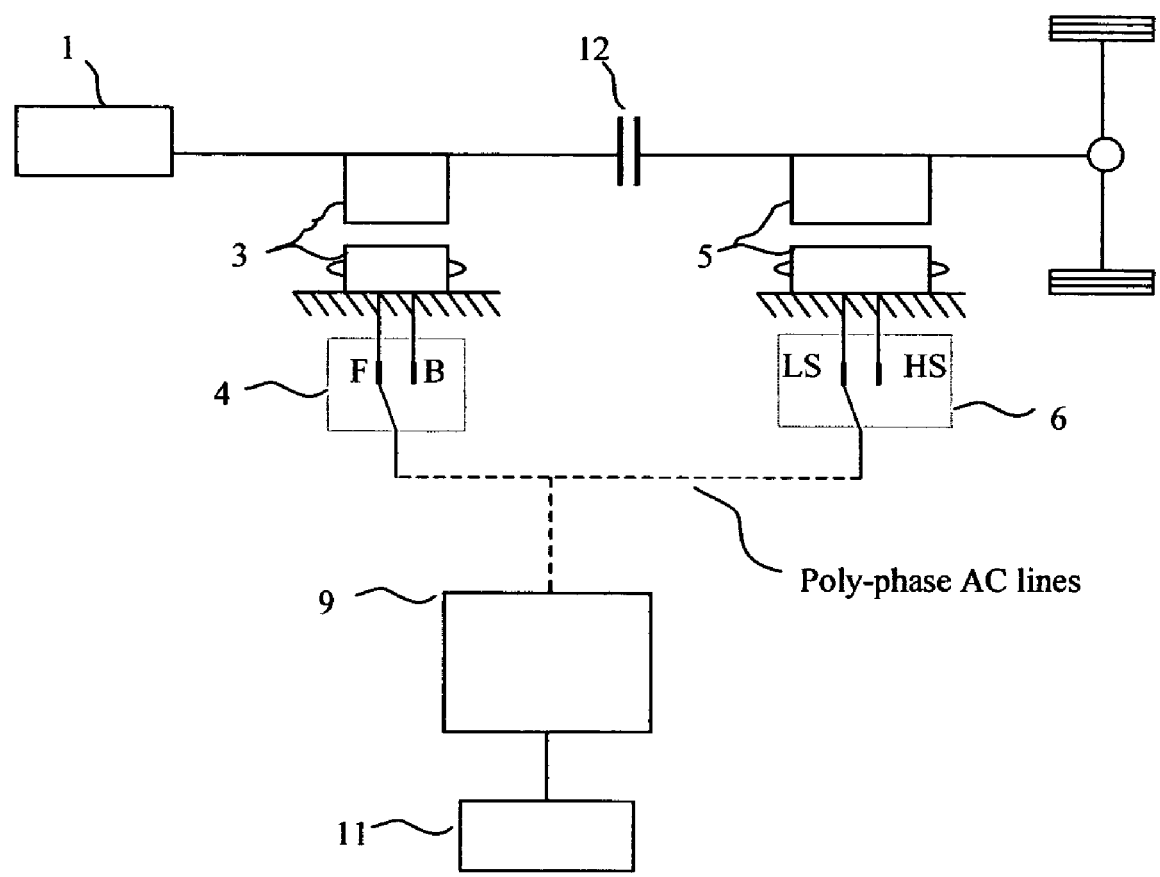
FIG. 1 illustrates a system configuration of a hybrid electric vehicle according to the present invention.

According to the present invention, a hybrid vehicle comprises an internal combustion engine 1, a starter/generator (SG) 3, a multi-speed traction motor (TM) 5, a motor control module (MCM) 9, a clutch 12, and a battery 11.

Engine 1 provides torque to SG 3 to generate electric power. Engine 1 drives the wheels directly when Clutch 12 is engaged while the vehicle is cruising.

SG 3 is a poly-phase alternator and is mounted on the engine shaft. It starts Engine 1 by using the AC power from MCM 9. When Engine 1 is running, SG 3 generates electric power. The AC power from SG 3 either directly goes to TM 5 or passes the inverter in MCM 9, being converted into DC power. The output frequency of SG 3 is proportional to the engine speed. To be accurate, the frequency is $f = n_{sg} * p_{sg}/60$, where $n_s$ is the rotor speed in rpm and $p_{sg}$ is the number of pole pairs of SG 3.

TM 5 is a multi-speed poly-phase AC induction motor. It uses the AC power from both SG 3 and MCM 9 to drive the wheels. It also provides braking torque to the wheels when brake is applied. During braking, TM 5 converts the vehicle's kinetic energy into electric energy for Battery 11 to store.

When driving, TM 5 speed is a little below its synchronous speed $n_s = 60*f/p_m$, where f is the current frequency, and $p_m$ is the number of pole pairs of TM 5. TM 5 has a speed switch 6, and Switch 6 can re-connect the winding of TM 5 and change the number of pole pairs. The speed of TM 5 can be changed by Switch 6 even the frequency is unchanged. For example, if the frequency is $f = 50$ Hz, and the $p_m$ is changed from 4 to 2, then the synchronous speed is changed from $n_s = 60*50/4 = 750$ rpm to $n_s = 60*50/2 = 1500$ rpm.

FIG. 2 shows the winding of a multi-speed motor and the connection of its speed switch. In the present invention, Speed-switch 6 is controlled by MCM 9. Switch 6 may have an idle position, so that TM 5 can be disconnected from MCM 9.

SG 3 is electrically connected to TM 5, so the input frequency of TM 5 is equal to the output frequency of SG 3. The frequency of SG 3 output is $f = n_{sg}*p_{sg}/60$, and the synchronous speed of TM 5 is $n_s = 60*f/p_m = p_{sg}*n_{sg}/p_m$. TM 5 speed is close to its synchronous speed, so the speed ratio of Engine 1 to TM 5 is $n_{sg}:n_s = p_m:p_{sg}$ approximately. If $p_m$, the pole-pairs number of TM 5 is changed, the speed ratio of Engine 1 to TM 5 will change.

For the sake of convenience of description, SG 3 has 1 pair of poles($p_{sg} = 1$), and TM 5 has 4 pairs of poles ($P_m = 4$) for the low speed and 2 pairs of poles ($p_m = 2$) for the high speed. When TM 5 is set at low speed, the speed ratio of SG 3 to TM 5 is 4:1. When TM 5 is set at high speed, the speed ratio of SG 3 to TM 5 is 2:1.

There is a direction switch 4 to provide reverse drive. Switch 4 can swap two of three lines of SG 3 output. When the two lines are swapped, SG 3 will drive TM 5 in the opposite direction. If Switch 4 is set at reverse and TM 5 is set at low speed, the speed ratio of Engine 1 to TM 5 is 4:(−1). Switch 4 may have an idle position, so SG 3 can be disconnected from MCM 9.

Clutch 12 allows Engine 1 to directly drive the wheels when the vehicle cruises, improving the fuel efficiency. It also provides the speed ratio of 1:1. Clutch 4 is disengaged when SG 3 is connected with TM 5 electrically.

By coordinating SG 3, TM 5 and Clutch 12, the system provides the speed ratios of 4:1, 2:1, 1:1 and 4:(−1), suitable to family vehicles.

Battery 6 stores and provides the electrical energy.

Including an inverter, MCM 9 converts DC from a battery into AC to drive the electrical machines; it also converts AC from the electric machines into DC for Battery 11 to store. MCM 9 powers SG 3 to start Engine 1, powers TM 5 to drive the wheels, and controls TM 5 to brake the wheels and regenerate electricity.

Operation

To pull off the vehicle from standstill while Engine 1 is off, MCM 9 is connected to both SG 3 and TM 5, and Switch 6 is set at low speed ($p_m = 4$). MCM 9 provides AC power to the two machines, increasing the frequency from zero. The AC current drives SG 3 to rotate Engine 1 and drives TM 5 to pull off the vehicle. When reaching its idle speed, Engine 1 starts and begins to drive SG 3 to generate electric power. SG 3 output has the same frequency and phase as MCM 9 output, so MCM 9 and SG 3 can join together to provide power to TM 5. The speed of Engine 1 and MCM 9 frequency go up, and TM 5 drives the vehicle faster and faster. The speed ratio of Engine 1 to TM 5 is $r = n_{sg}:n_m = p_m:p_{sg} = 4:1$.

When the vehicle reaches 20 mph, Engine 1 reaches 4000 rpm, and TM 5 reaches about $n_m = n_{sg}*P_{sg}/p_m = 4000*1/4 = 1000$ rpm. If the speed ratio is unchanged and the vehicle keeps accelerating, Engine 1 will overspeed. In order to change the speed ratio, MCM 9 reduces the frequency by half and slows SG 3 and Engine 1 down to 2000 rpm. At the same time, Switch 6 is switched to high-speed ($p_m = 2$) position, and TM 5 is set to high speed. The synchronous speed of TM 5 is $n_m = n_{sg}*p_{sg}/p_m = 2000*1/2 = 1000$ rpm, and it is not changed.

Now the speed ratio of Engine 1 to TM 5 is $r = n_{sg}:n_m = p_m:p_{sg} = 2:1$, and the speed of Engine 1 is 2000 rpm. SG 3 output has the same frequency and phase as MCM 9 output, so MCM 9 and SG 3 can join together to provide power to TM 5. The speed of Engine 1 and MCM 9 frequency go up, and TM 5 drives the vehicle faster and faster. The vehicle can be accelerated.

When the vehicle speed reaches 40 mph, Engine 1 reaches 4000 rpm again, and TM 5 reaches about 2000 rpm. If the speed ratio is unchanged and the vehicle keeps accelerating, Engine 1 will overspeed. In order to change the speed ratio, MCM 9 disconnects TM 5 and reduces the frequency by half. SG 3 and Engine 1 are slowed down to 2000 rpm. Now Engine 1 has the same speed as TM 5, and Clutch 12 is engaged. So Engine 1 can drive the wheels directly while MCM 9 powers SG 3 to provide boosting torque.

Now the speed ratio of engine 1 to TM 5 is $r = 1:1$, and the speed of Engine 1 is 2000 rpm. Engine 1 can drive to accelerate the vehicle.

When the vehicle cruises, Engine 1 drives the vehicle through Clutch 12 by itself. MCM is disconnected from SG 3 and connected to TM 5.

When braking torque is needed, MCM 9 set such a frequency that TM 5 synchronous speed is a little below the TM 5 speed. TM 5 will apply braking torque to the wheels. At the same time, TM 5 generates electric energy that is stored in Battery 11.

To reverse the vehicle, Switch 6 is set to low speed ($p_m$=4), and Switch 4 is shifted to swap two lines of SG 3. Engine 1 runs in the forward direction, but SG 3 generates such a current that drives TM 5 in the opposite direction, pushing the vehicle backward. The speed ratio of Engine 1 to TM 5 is 4:(−1). MCM 9 generates the current with the same frequency and phase as SG 3 output.

The system has "gear ratios" of 4:1, 2:1, 1:1, and 4:(−1), sufficient for most passenger cars and light trucks.

Figure 3:
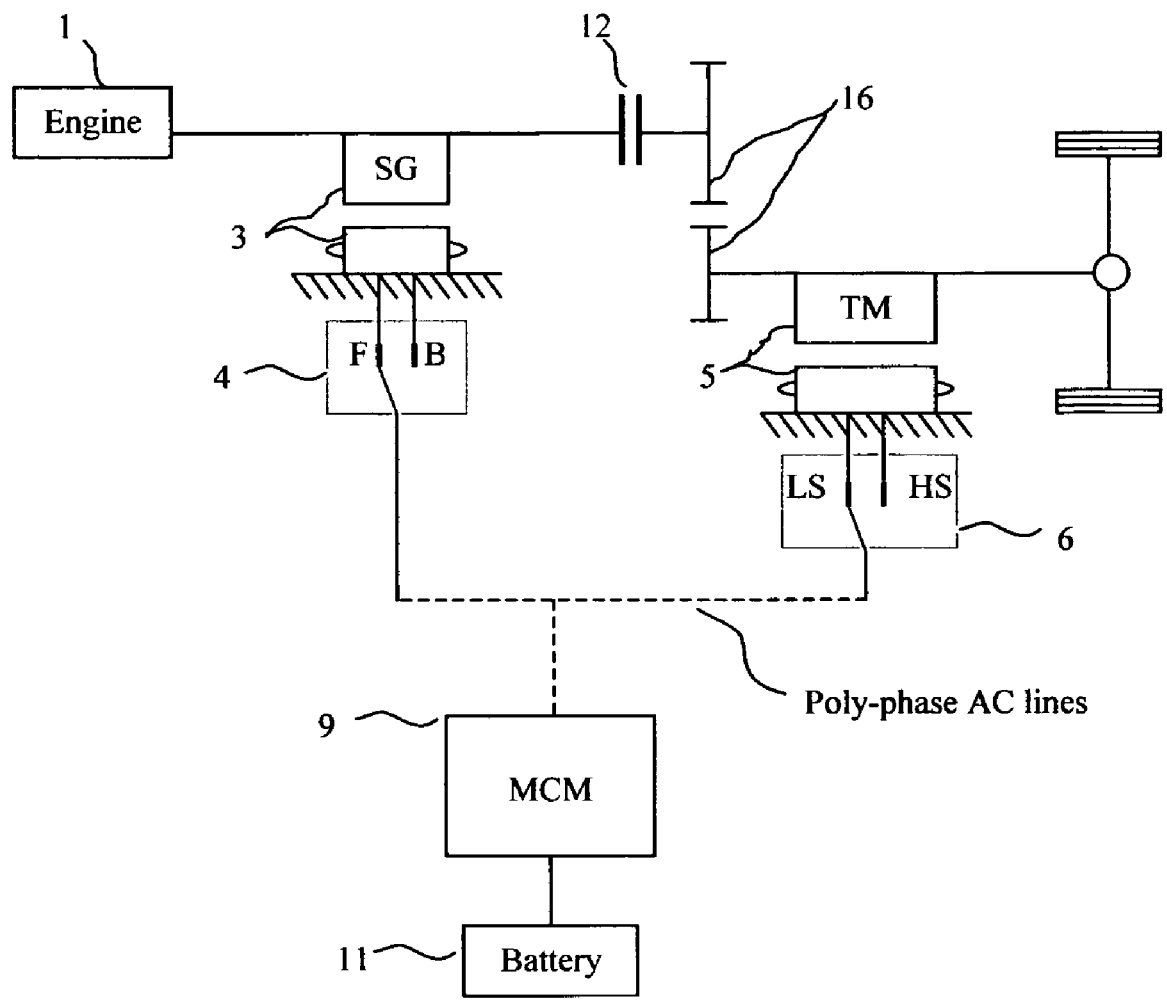
FIG. 3 illustrates a system configuration of a hybrid electric vehicle according to the present invention, wherein there is a set of gear between the traction motor and the clutch.

As shown in FIG. 3, a set of gears 16 may be added between TM 5 and Clutch 12. The gear provides flexibility for the top ratio design. For example, if the gear set has the gear ratio of 10:9, then the system will have the speed ratios of 4:1, 2:1, 0.9:1, and 4:(−1).

SG 3 and TM 5 may have different pole-pair numbers. For example, if $n_{sg}$=2, $n_m$=8 for low speed and $n_m$=4, for high speed, the system still has the speed ratios of 4:1, 2:1, 1:1, and 4:(−1).

If a set of gears 16 is added between Clutch 12 and TM 5, it is more flexible to select the pole-pair numbers for SG 3 and TM 5. For example, if $n_{sg}$=4, $n_m$=8 for low speed and $n_m$=4 for high speed, and the gear ratio is 20:9, the system has the speed ratios of 2:1, 1:1, 0.45:1, and 2:(−1).

From the description above, the present invention provides a hybrid electric vehicle which can improve the fuel efficiency. Although the mechanical transmission is eliminated, the vehicle still has three forward speed ratios and one reverse ratio. It allows the electric power generated by SG 3 to directly go to TM 5. It saves significant cost because it requires a smaller capacity of semiconductor inverter.

It should be understood that there is no intention to limit the invention to the specific forms disclosed, but on the contrary, the invention is to cover all variations, modifications and improvements that come with the true spirit and scope of the invention as expressed in the appended claims.

The invention claimed is:

1. A hybrid electric vehicle comprising:
   an internal combustion engine;
   an alternator for starting said engine and for generating poly-phase alternating current, said alternator being mounted to an engine shaft;
   a direction switch for swapping two of three power lines of said alternator;
   a motor for providing driving and braking torque to the wheels of the vehicle, said motor being a multi-speed poly-phase induction motor and having a speed switch for changing pole-pair number of said motor, said motor being electrically connected to said alternator through said speed switch and said direction switch;
   a clutch for connecting said engine shaft to a motor shaft and allowing said engine to drive the wheels directly;
   a battery; and
   a motor control module being connected to electric power lines of said alternator and said motor, said control module inverting direct current from said battery into poly-phase alternating current with variable frequency, said control module converting alternating current from said alternator and said motor into direct current, said control module setting positions of said speed switch and said direction switch.

2. A hybrid electric vehicle according to claim 1, wherein there is a set of gears between said clutch and said motor shaft.

3. A hybrid electric vehicle according to claim 1, wherein said direction switch is eliminated.

4. A hybrid electric vehicle according to claim 2, wherein said direction switch is eliminated.

5. A hybrid electric vehicle according to claim 1, wherein said direction switch is to swap two of three lines of said motor.

6. A hybrid electric vehicle according to claim 2, wherein said direction switch is to swap two of three lines of said motor.

* * * * *